(12) United States Patent
Ramasamy

(10) Patent No.: US 10,671,377 B2
(45) Date of Patent: Jun. 2, 2020

(54) METHOD TO DEPLOY NEW VERSION OF EXECUTABLE IN NODE BASED ENVIRONMENTS

(71) Applicant: VMWARE, INC., Palo Alto, CA (US)

(72) Inventor: Karthikeyan Ramasamy, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 14 days.

(21) Appl. No.: 15/795,291

(22) Filed: Oct. 27, 2017

(65) Prior Publication Data
US 2019/0018670 A1   Jan. 17, 2019

(30) Foreign Application Priority Data

Jul. 13, 2017   (IN) .............................. 201741024846

(51) Int. Cl.
| | | |
|---|---|---|
| *G06F 8/656* | (2018.01) | |
| *H04L 12/24* | (2006.01) | |
| *G06F 8/71* | (2018.01) | |
| *H04L 29/08* | (2006.01) | |

(52) U.S. Cl.
CPC .............. *G06F 8/656* (2018.02); *G06F 8/71* (2013.01); *H04L 41/082* (2013.01); *H04L 41/5041* (2013.01); *H04L 67/1095* (2013.01); *H04L 67/16* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 5,155,837 | A * | 10/1992 | Liu | .................... H04Q 3/54516 709/221 |
| 6,671,699 | B1 * | 12/2003 | Black | ......................... G06F 8/60 |
| 7,562,358 | B2 * | 7/2009 | Bennett | ..................... G06F 8/61 709/220 |
| 7,596,618 | B2 * | 9/2009 | Basu | ...................... H04L 45/46 455/453 |
| 7,953,787 | B2 * | 5/2011 | Potter | .................... H04L 67/10 709/201 |

(Continued)

OTHER PUBLICATIONS

Peyrott, "Intro to Microservices, Part 4", 2015, https://auth0.com/blog/introduction-to-microservices-part-4-dependencies/.*

(Continued)

*Primary Examiner* — Hossain M Morshed
(74) *Attorney, Agent, or Firm* — Patterson + Sheridan, LLP

(57) ABSTRACT

One or more embodiments provide techniques for processing a request entering a node cluster managed by a control plane executing on a computing service. A first node of the node cluster receives a request for a service. The first node determines to which service object in the first node to route the request. The first node identifies an existing version of the service executing thereon. The first node determines whether there exists an updated version of the service executing thereon. Upon determining that the updated version of the service does exist, the first node sets the existing version of the service as the current version of the services. The node routes the request to a first service object associated with the current version of the service using a handler of the first service object.

15 Claims, 7 Drawing Sheets

(56) References Cited

U.S. PATENT DOCUMENTS

| | | | | |
|---|---|---|---|---|
| 8,370,467 | B1* | 2/2013 | Sauer | H04L 69/02 |
| | | | | 709/217 |
| 9,575,744 | B2* | 2/2017 | Katkere | G06F 8/71 |
| 10,142,353 | B2* | 11/2018 | Yadav | H04L 43/04 |
| 2010/0299437 | A1* | 11/2010 | Moore | H04L 67/1008 |
| | | | | 709/226 |
| 2017/0046146 | A1* | 2/2017 | Jamjoom | G06F 8/62 |
| 2017/0374145 | A1* | 12/2017 | Chrysanthakopoulos | |
| | | | | G06F 16/23 |
| 2018/0107586 | A1* | 4/2018 | Vyas | G06F 9/455 |
| 2019/0018670 | A1* | 1/2019 | Ramasamy | G06F 8/656 |

OTHER PUBLICATIONS

Ponnusamy, "Virtual network Routing in Cloud Computing Environment", 2016, ICCCI—2016), Jan. 7-9, 2016, Coimbatore, India (Year: 2016).*

* cited by examiner

US 10,671,377 B2

METHOD TO DEPLOY NEW VERSION OF EXECUTABLE IN NODE BASED ENVIRONMENTS

RELATED APPLICATIONS

Benefit is claimed under 35 U.S.C. 119(a)-(d) to Foreign Application Serial No. 201741024846 filed in India entitled "METHOD TO DEPLOY NEW VERSION OF EXECUTABLE IN NODE BASED ENVIRONMENTS", on Jul. 13, 2017, by VMware, Inc., which is herein incorporated in its entirety by reference for all purposes.

BACKGROUND

The use of monolithic applications in a computing system, such as a cloud computing system, is gradually being replaced by sets of loosely coupled, independent services. Factoring application into small services (sometimes referred to as "micro-services") allows those services to have a developmental and operational lifecycle that is independent of their peers. These services typically have a smaller set of responsibilities than their monolithic predecessors, as well as a well-defined application programming interface (API).

The use of such a system of micro-services also comes at a cost: every service may use its own data model, use its own backing store, and define its own interfaces and its own interaction models. As the number of services increases, it becomes difficult to administer the system. As such, administrators and operators of such systems must possess deep system knowledge to identify runtime issues, and must be informed of the intricacies of every new service added to the system. The proliferation of service technologies also means that users of the system have to use various methods to interact with the system, with varying degrees of observability and extensibility.

SUMMARY

One or more embodiments provide techniques for processing a request entering a node cluster managed by a control plane executing on a computing service. A first node of the node cluster receives a request for a service. The first node determines to which service object in the first node to route the request. The first node identifies an existing version of the service executing thereon. The first node determines whether there exists an updated version of the service executing thereon. Upon determining that the updated version of the service does exist, the first node sets the existing version of the service as the current version of the services. The node routes the request to a first service object associated with the current version of the service using a handler of the first service object.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
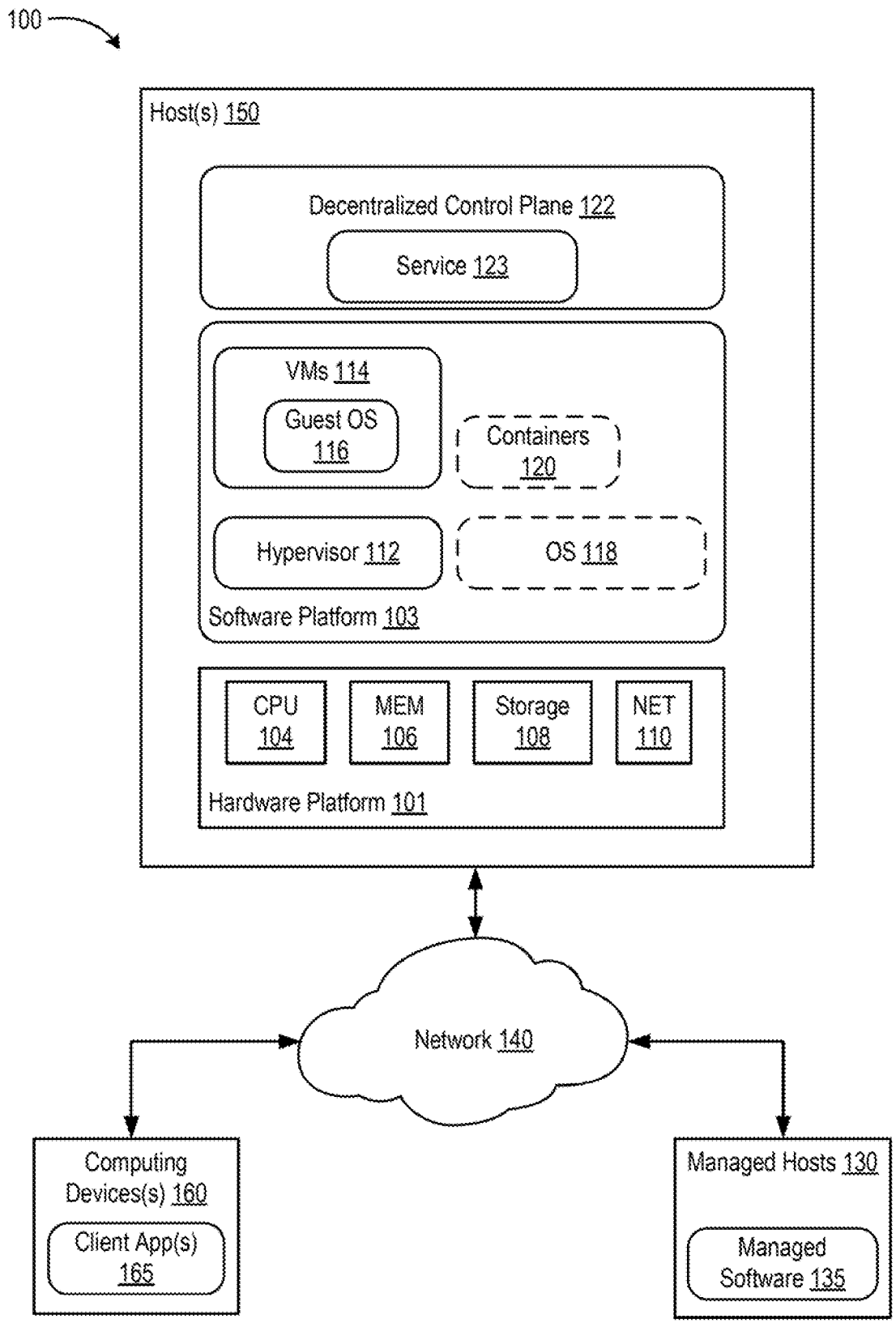
FIG. 1 is a block diagram depicting an embodiment of a computer system support execution of decentralized control plane (DCP) software, according to an embodiment disclosed herein.

FIG. 1 is a block diagram depicting an embodiment of a computer system 100 support execution of decentralized control plane (DCP) software (DCP 122). At least a portion of computer system 100 may be part of an on-premise data center controlled and administered by a particular enterprise or business organization, part of a cloud computing system operated by a cloud computing service provider, or part of a combination of on-premise data center and cloud computing systems. On-premise data center may sometimes be referred to as a "private" cloud; a cloud computing system may be referred to as a "public" cloud; and a combination thereof may be referred to as a "hybrid cloud."

Computer system 100 includes one or more host computers ("host(s) 150"), a network 140, managed hosts 130, and one or more computing devices 160. Network 140 can include various routers, switches, and like network appliances that facilitate communication among hosts 150, between host(s) 150 and computing device(s) 160, and between host(s) 150 and managed hosts 130. Each host 150 is constructed on a hardware platform 101, such as an x86 architecture platform. As shown, hardware platform 101 includes conventional components of a computing device distributed across host(s) 150, such as central processing units ("CPU 104"), system memory ("MEM 106"), storage resources ("storage 108"), and network resources ("NET 110"). CPU 104 is configured to execute instructions, for example, executable instructions that perform one or more operations described herein. Such executable instructions can be stored in memory 106 and/or storage 108. Memory 106 includes devices allowing information, such as executable instructions and data, to be stored and retrieved. Memory 106 may include, for example, one or more random access memory (RAM) modules. Network interface (NET) 110 enables host(s) to interface with network 140 and can include network adapters. Storage 108 includes local storage devices (e.g., one or more hard disks, flash memory modules, solid state disks, and optical disks) and/or storage interfaces to network data storage systems (not shown). Example network data systems include storage area networks (SANs), a network-attached storage (NAS), and the like. Data "stored" in storage 108 encompasses both data stored in the local storage devices and data stored on network data storage systems accessible through the storage interfaces.

Host(s) 150 includes a software platform 103 executing on hardware platform 101. In an embodiment, software platform 103 includes a virtualization layer that abstracts processor, memory, storage, and network resources of hardware platform 101 into multiple virtual machines ("VMs 114") that run concurrently on the same hosts. VMs 114 run on top of the virtualization layer, referred to herein as a hypervisor 112, which enables sharing of the hardware resources by VMs 114. One example of hypervisor 112 that may be used in an embodiment described herein is a VMware ESXi™ hypervisor provided as part of the VMware vSphere® solution made commercially available from VMware, Inc. of Palo Alto, Calif. Hypervisor 112 may run directly on hardware platform 101 or on top of operating system. Each of VMs 114 executes a guest operation system ("guest OS 116"). Guest OS 116 can be any commodity operating system known in the art.

In another embodiment, software platform 103 includes an operating system ("OS 118") that runs directly on hardware platform 101. Operating system 118 can be any commodity operating system known in the art. In another embodiment, software platform 103 includes containers 120 executing within operating system 118. Containers 120 implement operating system-level virtualization wherein an abstraction layer is provided on top of kernel of operating system 118. The abstraction layer supports multiple containers each including an application and its dependencies. Containers 120 do not include a guest OS and are sometimes referred to as "OS-less containers." Each container runs as an isolated process in userspace and shares the kernel with other containers. The container relies on the kernel's functionality to make use of resources isolation (CPU, memory, block I/O, network, etc.) and separate namespaces and to completely isolate the application's view of the operating environments. By using containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory, and I/O. The term "virtualized computing instance" as used herein is meant to encompass both VMs and containers. The term "virtualization software" as used herein is meant to encompass both a hypervisor and an operating system kernel supporting containers. Each host 150 can include any embodiment of the software platform 103 described above.

Software platform 103 provides an interface between DCP 122 and hardware platform 101. DCP 122 can execute in a single host 150 or can be distributed across multiple hosts 150. For any host 150, DCP 122 can execute within guest OS 116 of one or more VMs 114, within OS 118, or within one or more containers 120 running on OS 118. DCP 122 includes a programmable framework and runtime software that enable building and running of distributed, highly available, and scaled-out services 123 (also referred to as "microservices"). Services 123 include an external representation state transfer (REST) interface and can be implemented by a set of distributed nodes. DCP 122 includes a document store for backing service state and the runtime provides replication, synchronization, ordering, and consistency for the service state. One example of DCP that may be configured and used as described herein is Project Xenon™ distributed by VMware, Inc. of Palo Alto, Calif.

In an embodiment, DCP 122 manages hosts ("managed hosts 130") and software installed on such hosts ("managed software 135"). Managed hosts 130 can be configured similarly to host(s) 150. Managed software 135 can include hypervisors, VMs, guest OS, containers, OS, and the like (similar to software platform 103), as well as applications. DCP 122 can be used to build an IaaS fabric within managed hosts 130. Services 123 can be used for configuration (desired state), workflows (e.g., finite state machine tasks), grooming, scheduling, logic, and the like. IaaS implementation is just one example use of DCP 122. In general, DCP 122 includes services that can be used to manage various aspects of managed hosts 130 and managed software 135.

Computing devices 160 can execute client applications 165 to interact with DCP 122. Computing devices 160 can include computers, laptops, tablets, mobile devices, or the like. Client applications 165 can communicate with services of DCP 122 using their REST interfaces. Client applications 165 can start, pause, resume, and stop services of DCP 122 using REST application programming interface (API) commands, as described further below.

Figure 2:
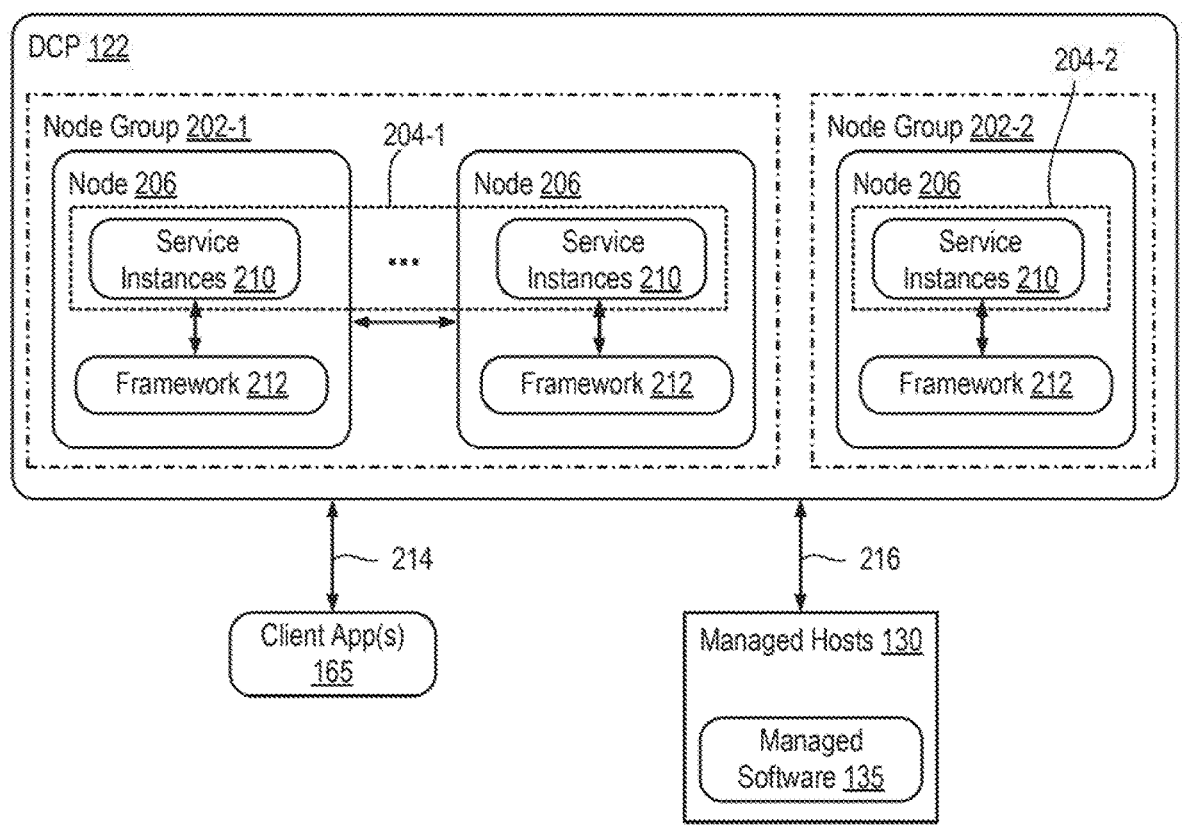
FIG. 2 is a block diagram depicting DCP, according to an embodiment disclosed herein.

FIG. 2 is a block diagram depicting DCP 122, according to an embodiment. DCP 122 includes one or more nodes 206. A "node" is a process, which can execute in various contexts, such as an OS of a host computer, a guest OS of a VM, container in an OS, etc. In general, nodes 206 host one or more services 204. Thus, a node is an instance of a "service host process." A node can execute directly on an OS kernel (e.g., compiled C, C++, etc., processes) or within a runtime environment (e.g., Java®, Go™, etc.). In various examples described herein, each node 206 is a Java® process with Java® objects, but those skilled in the art will appreciate that the examples can be ported to other programming languages and platforms. Each node 206 is accessed using an Internet Protocol (IP) address and transmission control protocol (TCP) port. A given host environment (e.g., OS, guest OS, container, etc.) can host one or more nodes. In cases where a host environment hosts multiple nodes, each node can be assigned a different IP address and/or TCP port. For example, a service DCP 122 named "Examples" can be accessed on a node localhost through port 8000 using a uniform resource indicator (URI) hypertext transfer protocol (http)://localhost:8000/core/examples.

A "service" is a logical object in DCP 122 having a unique URI. An example, URI of a service is /core/examples/example1. A service is managed externally through a REST API. Each node 206 hosts one or more service instances 210. A "service instance" in an object within a node that handles requests targeting a service 123 maps to a service instance 210. For example, if a node 206 is a Java® process, a service instance 210 can be a Java® object instantiated in the Java® process. A "request" is a message including verb mapped to an action of the REST API. In an embodiment, the REST API supports actions mapped to hypertext transfer protocol (HTTP) verbs, such as POST, DELETE, PATCH, PUT, and GET. A "response" is a message including status and potentially results of a request.

A service 123 of DCP 122 is implemented by one or more service instances 210 within one or more nodes. Nodes 206 can be organized in node groups, e.g., node group 202-1 and node group 202-2 (generally node groups 202). Each node group 202 includes one or more nodes 206. In the example, node group 202-1 includes a plurality of nodes 206, whereas node group 202-2 includes a single node 206. Services 23 can be instantiated across a plurality of nodes (i.e., a given service 123 can be implemented using a plurality of service instances 210 across a plurality of nodes 206). In such case, services instances 210 include the same URI at their respective nodes (e.g., /core/examples/example1) and implement a single service 123. Multiple service instances 210 can be implemented on a single node, in which case each service instance includes a unique URI and represents a unique service (e.g., /core/examples/example1 and /core/examples/example2). Unique services can be of the same service type (e.g., /core/examples/example1 and /core/examples/example2 can have an example service type). In the example, services are distributed across nodes 206 in node group 202-1, and services 123 are implemented by node 206 in node group 202-2.

Each node 206 provides a framework 212. Framework 212 provides runtime support for instances 210. Framework 212 provides a plurality of functionalities, such as replication, synchronization, ordering, and consistence of service state. Framework 212 also maintains a document store for persistent storage of states associated with services 123 that are configured as durable.

Client applications 165 interact with services 123 of DCP 122 using an asynchronous request/response protocol 214. In an embodiment, request/response protocol 214 is HTTP. Services 123 can interact with each other using request/response protocol 214. Services 123 can also interact with themselves using request/response protocol 214 (e.g., a service 123 can update its state using a PATCH verb). Services 123 interact with managed hosts 130 and managed software 135 using interface 216, which can operate suing any type of protocol (e.g., remote procedure protocol (RPC), HTTP, etc.) that can be used to communicate with a control managed hosts 130 and managed software 135.

Figure 3:
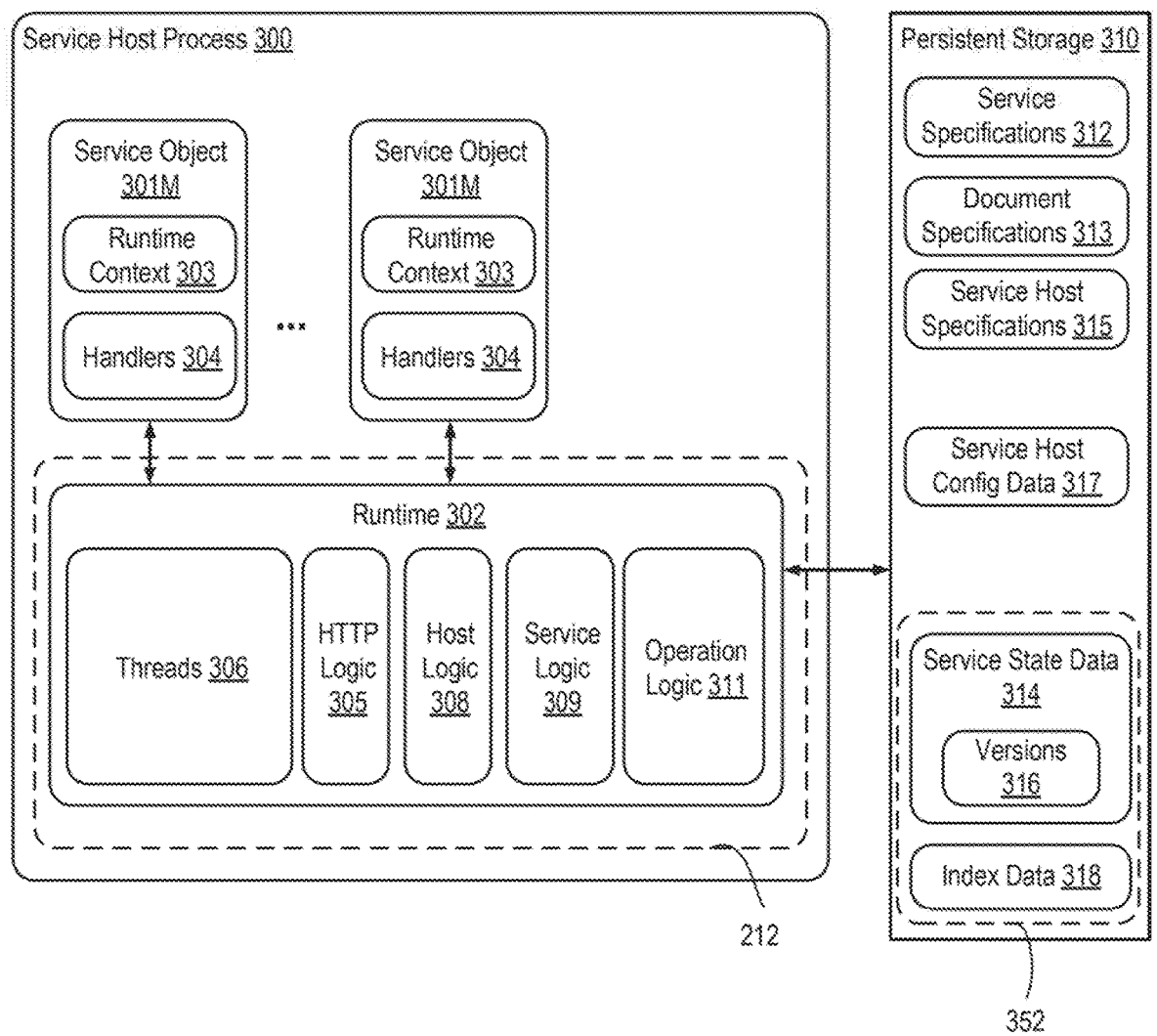
FIG. 3 is a block diagram depicting a service host process of DCP, according to an embodiment disclosed herein.

FIG. 3 is a block diagram depicting a service host process 300 of DCP 122, according to an embodiment. Service host process 300 can be a node 206 of DCP 122 as described above. In the example, service host process 300 includes a plurality of service objects 301M, which are service instances of one or more user-created services.

Framework 212 includes runtime software (referred to as "runtime 302"). Runtime 302 is the code of the service host process executed by CPU 104. Runtime 302 may include HTTP logic 305, host logic 308, service logic 309, and operation logic 311. Runtime 302 accesses persistent storage 310, which stores a document store 352, service specifications 312, document specifications 313, service host specifications 315, and service host configuration data 317. Persistent storage 310 is implemented by storage 108. Document store 352 includes a service state data 314 and index data 318. Service state data 314 can include one or more versions 316 of service states for the services of the control plane.

In general, a user specifies a plurality of service options for services in service specifications 312. In this manner, service specifications 312 define the capabilities of respective services. In an embodiment, classes (e.g., Java® classes) define a service type and service specifications 312 include class definitions for various service types.

Host logic 308 is configured to manage service lifecycle and handle delivery of operations to services (remote and local). Host logic 308 maintains a runtime context that includes various information, such as IP address, TCP port number, node ID, and the like. At least a portion of the runtime context of host logic 308 can be saved in service host configuration data 317. Host logic 308 includes various methods for initialization of runtime 302, as well as starting, stopping, pausing, resuming, etc. of core services, service factories, utility services, and user-created services. Host logic 308 can also include methods for applying authorization policies, loading service state from and saving service state to document store 352, caching service state, queuing and forwarding requests to service objects, and performing maintenance on host services. Host logic 308 also schedules service handlers to use threads 306 when the service handlers are invoked.

Service logic 309 is configured to implement base functionality for services. Service logic 309 includes functions for queuing requests, checking service state, handling requests, loading and linking service state, validating updates to service state, handling REST API verbs, handling request completions, handling replication, and handling synchronization.

Each service object 301M includes a runtime context 303 and handlers 304. Runtime context 303 can store various information for service object 301M, such as a current processing stage of the service object (e.g., created, available, stopped, etc.), the current version of the service state, the current epoch for replication, and the like. Runtime context 303 is the portion of a service object 301M that is stored in memory. Handlers 304 can include functions invoked by runtime 302 when services are created, started, paused, resumed, and stopped. Handlers 304 can include functions invoked by runtime 302 for verbs of the REST API. Handlers 304 can extend or replace functionality of service logic 309. Handlers 304 can supply required functionality not present in service logic 309. A user can specify handlers 304 as part of service specifications 312. When a handler 304 in invoked, host logic 308 allocates a thread 306 to the handler.

Figure 4:
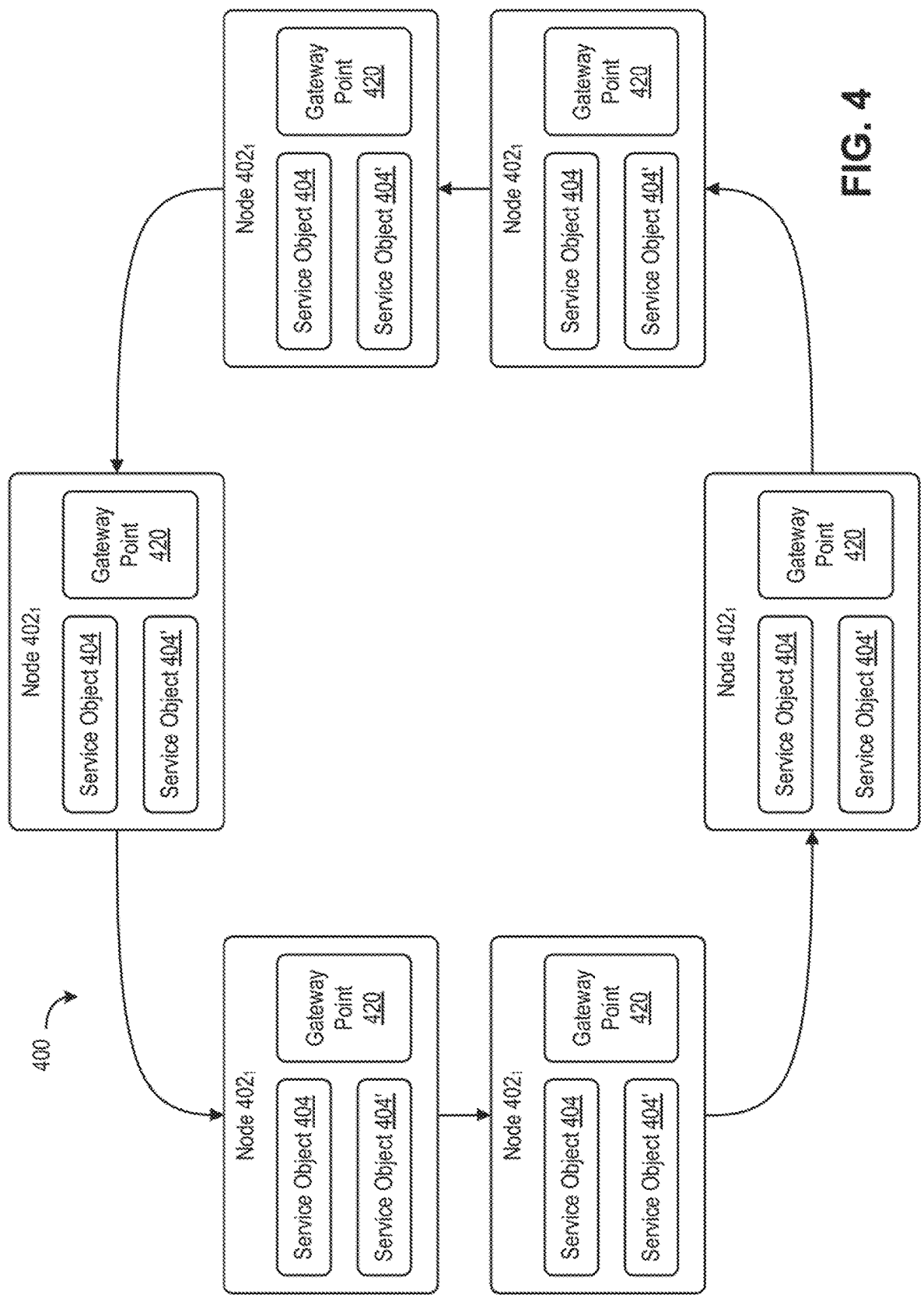
FIG. 4 illustrates an example cluster of nodes, according to an embodiment disclosed herein.

Framework 212 is configured to support clustering, that is, the ability to group together a set of nodes for the purposes of scale out, high availability, and unified management. Framework 212 manages node group membership (e.g., using node group services), balancing and forwarding of requests, replication and synchronization. Framework 212 also implements balancing and forwarding of requests (e.g., using host logic 308 and node selector service). A request can enter through a node in the node group. If a service includes an owner, framework 212 forwards requests targeting the service to its owner mode. Node selector service employs a consistent hashing algorithm to designate an owner node for a given service per request. As a result, ownership per service is fixed as long as node g FIG. 4 illustrates an example cluster 400 of nodes $402_1$-$402_6$ (each node generically, node 402$i$). Each node 402$i$ is configured to run one or more services thereon. In an embodiment, each node 402$i$ is configured to run a unique service thereon. In another embodiment, a service may be run across two or more nodes 402$i$. As discussed above in conjunction with FIGS. 2 and 3, each node 402$i$ generally includes framework $212_i$. Each framework $212_i$, provides a plurality of functionalities, such as replication, synchronization, ordering, and consistence of service state. Framework $212_i$, also maintains document store $352_i$, for persistent storage of states associated with services that are configured as durable. As such, each node 402$i$ is an independent entity having a unique in-memory data store (data store $352_i$) contained therein.

For purposes of FIG. 4, a service 404 executes across cluster 400 of nodes 402$i$. Service 404 may be one or more microservices associated with a larger application. As shown, a first version ("Version_1") of service 404 is executing across each node 402$i$. In some techniques, when an updated version of service 404 is ready for distribution among nodes 402$i$, each node 402$i$ must be paused or shut down for the service 404 to be updated. Accordingly, an updated version of the service 404' will be initialized, and subsequently re-started, for further handling of requests. During this down time however, each node 402$i$ is no longer able to handle incoming requests. When the number of requests received increases to the hundreds or the thousands per second, for example, any down time of the nodes 402$i$ can contribute to a significant delay in a business' services. This has led to a challenge of deployment of the updated version of service 404 on each node 402$i$, thus replacing the existing version.

Techniques discussed below provide an improved method of updating a service executing across nodes of a cluster without having to suspend handling of requests entering a node 402$i$. Such method involves the subsequent deployment of an updated service version 304' while original service version 304 remains deployed.

Each node 402$i$ includes a gateway point 420. Gateway point 420 is a point to which other nodes 402$i$ can connect. For example, gateway points 420 may provide a means for peer-to-peer communication among nodes 402$i$ in cluster 400. Abstracted behind each gateway point 420 is a local discovery service which includes details directed to the current version of the service, as well as any updated version of the service that may be available. Gateway point 420 may determine that an updated service version is available to be deployed on node 402$i$. Accordingly, when updated service version is available, the local discovery service may begin deployment of a service object 404' associated with the updated service version 404' alongside original service version 404. Simultaneously beginning deployment updated service object 404' while service object 404 associated with original service version remains deployed, ensures that cluster 400 may continue to receive and handle requests among nodes 402$_i$ while updated service object 404' "warms up," or initializes.

Figure 5:
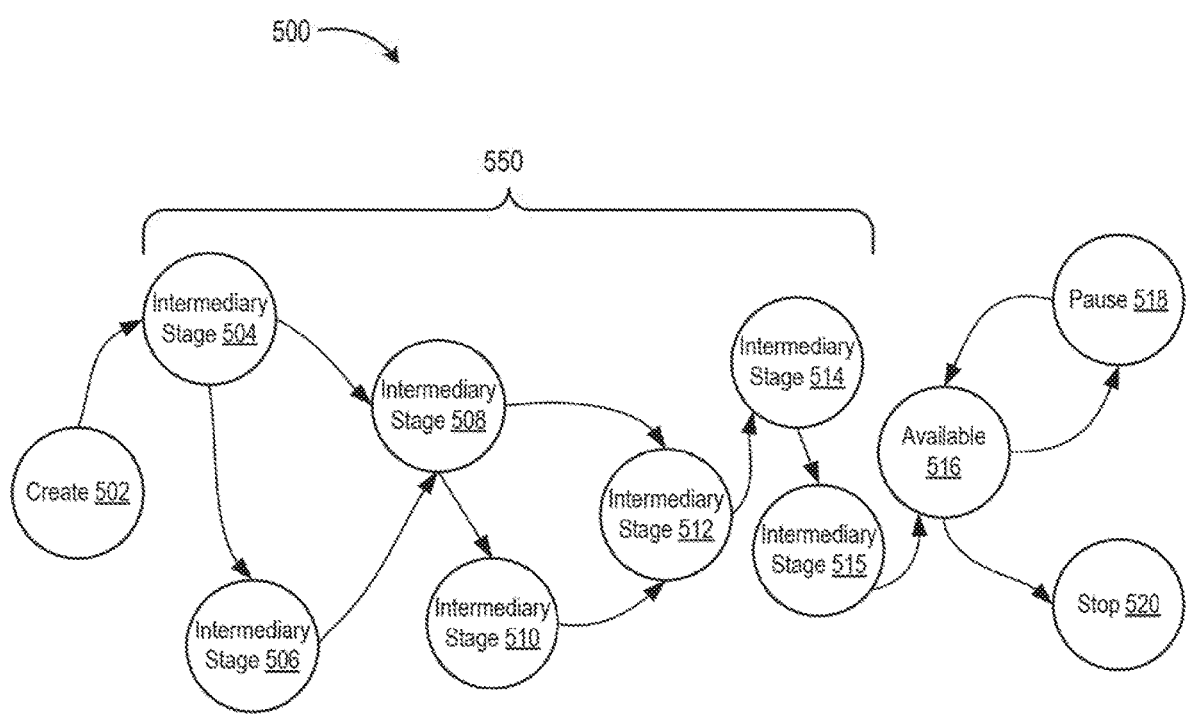
FIG. 5 is a state diagram showing a deployment lifecycle of updated service version as a service object, according to an embodiment disclosed herein.

For example, FIG. 5 is a state diagram showing a deployment lifecycle 500 of updated service version as a service object 404', according to an embodiment. Updated service object 404' transitions through a plurality of process stages of deployment lifecycle 500. Deployment lifecycle 500 begins at a create stage 502, where a service object is instantiated (e.g., using a service factory object or directly by the service host process) and is attached to the service host process. The service host process maintains a list of all attached service objects. Deployment lifecycle 500 then transitions to available stage 516. At available stage 516, updated service version 404' becomes available to handlers for routing of subsequent received requests.

Between create stage 502 and available stage 516, there may be one or more intermediary stages 504-515 therebetween. For example, the one or more intermediary stages 504-515 may comprises processes directed to the deployment of updated service object 404'. For example, intermediary stage 504 may be directed to an initialization stage in which runtime 302 initializes an operation object that encapsulates the startup request. Runtime 302 can also determine whether update service object 404' being started is indexed and, if so, selects a load state stage as the next intermediary stage 506. If the service being started is not indexed, runtime 302 selects an owner selection stage as the next intermediary stage 508.

After initialization, deployment lifecycle 500 can transition to load state stage as intermediary stage 506 (i.e., if the service is indexed). During the load state stage, runtime 302 loads the most recent service document of the service into memory and links it to the startup request. If there is an initial service state provided in the request to create the service, the initial service state is used as the most recent service document.

From either initialization stage (intermediary stage 506) or load state stage (intermediary stage 508), deployment lifecycle 500 transitions to intermediary stage 508 as owner selection stage. At owner selection stage, runtime 302 determines whether the service being started is replicated. If not, runtime 302 transitions directly to start stage (intermediary stage 512). If the service being started is replicated, runtime 302 assigns a node ID of the owner node for the service to the updated service object 404' and sets the next intermediary stage 510 as a synchronization stage.

During synchronization stage, the service object associated with updated service version 404' for the service on peer nodes. From either owner selection stage (intermediary stage 508) or synchronization stage, deployment lifecycle transitions to intermediary stage 512 as a start stage. At start stage, the updated service object 404' becomes visible to clients, processes any self-requests, and queues external requests. Runtime 302 calls a creation handler, start handler, or both of the service object associated with the updated service version 404' during start stage.

From intermediary stage 512, deployment lifecycle 500 transitions to intermediary stage 514 as an index state stage. At index state stage, runtime 302 requests index service to index and store the service document object linked to the updated service object 404'.

From intermediary stage 514, deployment lifecycle 500 may transition to intermediary stage 515 as a data migration stage. During data migration stage, data from the existing service object (e.g., service object 404) is migrated to the new version of the service object that is "warming up." For example, a service or migrator process may migrate data from service object 404 to the new version of the service, i.e., service object 404'. In some embodiments, the data migration stage may be run as a separate stage, such as that illustrated in intermediary stage 515. In other embodiments, the data migration may be implemented along with a previous intermediary stage, such as one of intermediary stages 504-514. In yet another embodiment, the data migration may be run across multiple intermediary stages. The data migration stage may run as part of a deployment warm up process for state-full services which has data associated therewith.

From intermediary stage 515, deployment lifecycle 500 transitions to available stage 516. At available stage 516, the updated service object 404' de-queues and processes requests.

From available stage 516, deployment lifecycle 500 can transition to a pause stage 518. In pause stage, the service is paused (e.g., runtime 302 can pause a service in response to memory pressure). Deployment lifecycle 500 can transition back to available stage 516 from pause stage 518 (e.g., runtime 302 can resume a pause service in response to a request targeting the service). From available stage 516, deployment lifecycle 500 can transition to a stop stage 520. At stop stage 520, runtime 302 reclaims resources used by the service object. Runtime 302 calls a stop handler of the updated service version 404' during stop stage 520 and removes the service object from the attached service list of the service host process.

Referring back to FIG. 4, while the service object associated with updated service object 404' undergoes startup portion 550 (i.e., from create stage 502 to available stage 516) of deployment lifecycle 500, original service version 404 remains in an available stage for continual processing of incoming requests. Accordingly, gateway point 420 continues to invoke handler 304, associated with original service version 404. Only when updated service version 404' reaches available stage 516 does gateway point 420 re-direct requests to updated service version 404' by invoking handler 304' associated with updated service object 404'. In some embodiments, after gateway point 420 re-directs requests to updated service version 404', original service object 404 may transition to a stop stage, resulting in runtime 302 calling a stop handler of original service object 404 to remove original service object 404 from node $402_i$.

Figure 6:
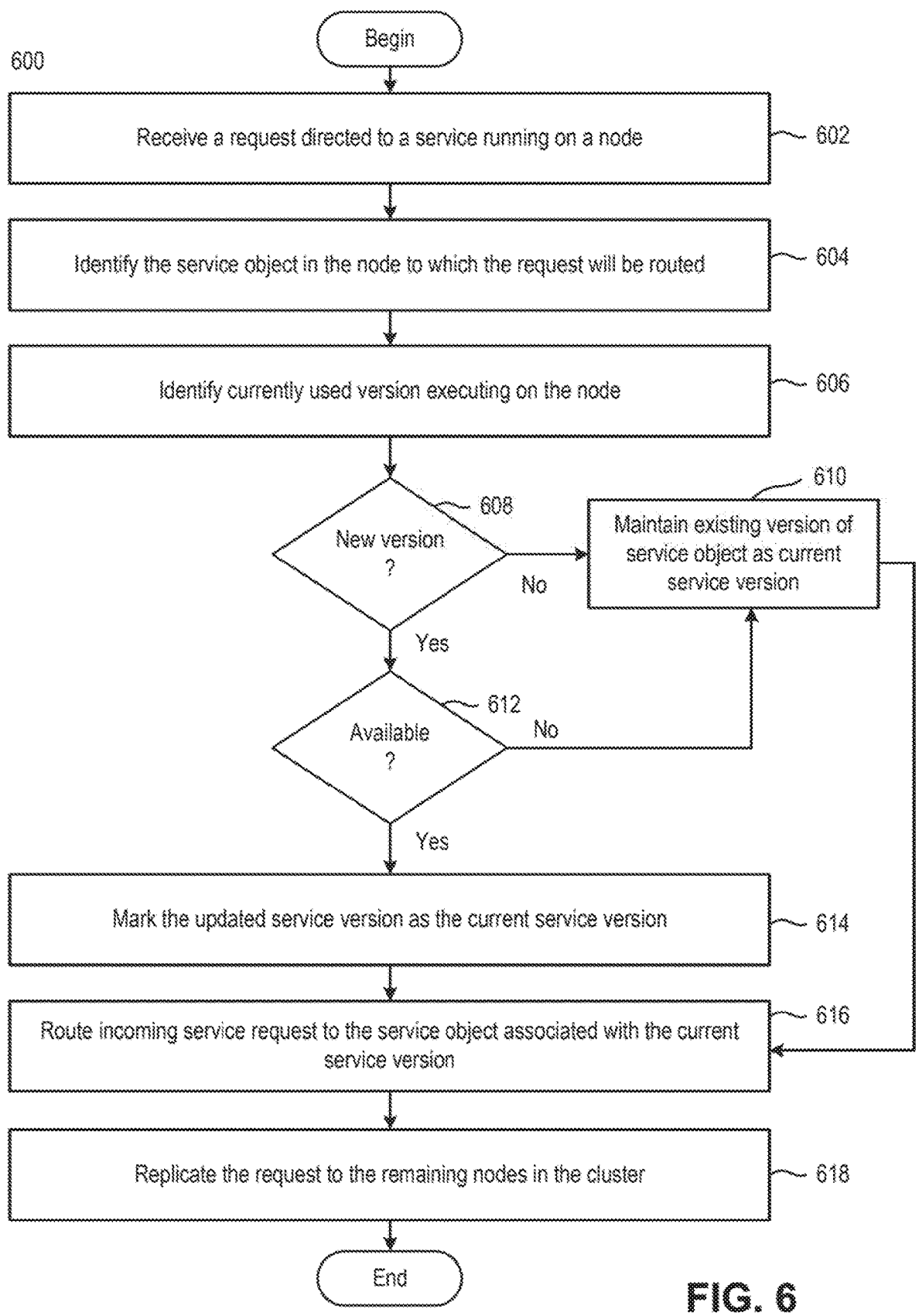
FIG. 6 is a flow diagram illustrating a method 600 of deploying an updated version of a service executing across a cluster of nodes, according to one embodiment disclosed herein.

FIG. 6 is a flow diagram illustrating a method 600 of deploying an updated version of a service executing across a cluster of nodes, according to one embodiment. For example, the method 600 may be used when deploying updated service version 404 on a node 402$i$ in cluster 400.

The method 600 begins at step 602. At step 602, gateway point receives a request directed to a service running on a node. For example, node $402_1$ receives a request at gateway point directed to a service 404 executing thereon. The "request" may a message including verb mapped to an action of the REST API. In an embodiment, the REST API supports actions mapped to hypertext transfer protocol (HTTP) verbs, such as POST, DELETE, PATCH, PUT, and GET. In some examples, node $402_1$ is not the owner, or leader, node for cluster 400. In these examples, node $402_1$ may optionally transmit the request to the leader node for initial processing.

At step 604, gateway point identifies which service object to which the request will be routed. For example, a node may include one or more service objects directed to one or more services running thereon. In the present example, there may exist one or more service objects directed to one or more versions of the service on the node. For example, as shown in FIG. 3, node $402_1$ may include a first service object $404_1$ directed to a current service version and a second service object $404_1$' directed to an updated service version.

When identifying to which service object to route the request, a load discovery service, abstracted the gateway point, identifies the currently used version executing on the node (step 606). For example, regarding node $402_1$, local discovery service may determine that current service version is the currently used version executing on node $402_1$.

At step 608, local discovery service determines whether there exists a new version of current service version. For example, local discovery service determines whether there exists a new version of current service version. If local discovery service determines that there does not exist a new version of existing service version, then at step 610, local discovery service maintains existing service versions as the current service version.

If, however, at step 608, local discovery service determines that there does exist a new version of the current version, then at step 612, local discovery service determines whether the service object associated with a new service version is at the available stage (i.e., whether the service objects is "warmed up"). For example, the service object $404_1$' associated with the new service version may be at an intermediary stage, such as one of an initialization stage, load state stage, owner selection stage, or sync stage.

If at step 612 local discovery service determines that the service object $404_1$' associated with the new service version is not at the available stage, then the method 600 reverts to step 610, and local discovery service maintains the existing service version as the current service version. For example, referring to FIG. 4, if local discovery service determines that service object $404_1$' associated with the updated service version is not at the available stage, then local discovery service maintains that service object $404_1$ associated with the existing service version is the current service version.

If, however, at step 612, local discovery service determines that the service object $404_1$' associated with the new service version is at the available stage, then at step 614, local discovery service replaces the existing service version with the updated service version, and marks the updated service version as the current service version. For example, referring to FIG. 4, if local discovery service determines that service object $404_1$' associated with the updated service version is at the available stage, then local discovery service marks service object $404_1$' associated with the updated service version is the current service version. Local discovery service may then notify gateway point of the current service version. For example, local discovery service either notifies gateway point that the current service version is the existing service version or the updated service version.

At step 616, gateway point routes the incoming service request to the service object associated with the current service version. For example, gateway point routes the incoming service request to the service object associated with the current service version using the handler associated with the respective service object. Using the example of FIG. 3, gateway point routes the incoming service request to either service object $404_1$ associated with the existing service version using handler for service object $404_1$ or routes the incoming service request to service object $404_1$' associated with updated service version using handler for service object $404_1$'.

At step 618, gateway point replicates the request to the remaining nodes in the cluster. For example, gateway point 420 replicates the request received at node $402_1$ to the remaining nodes (i.e., nodes $402_2$, $402_3$, $402_4$, $402_5$, and $402_6$). Accordingly, when the request reaches each node, the gateway point associated with each node undergoes the same process as that above (i.e., steps 602-616) to determine to which service object to route replicate the request.

Figure 7:
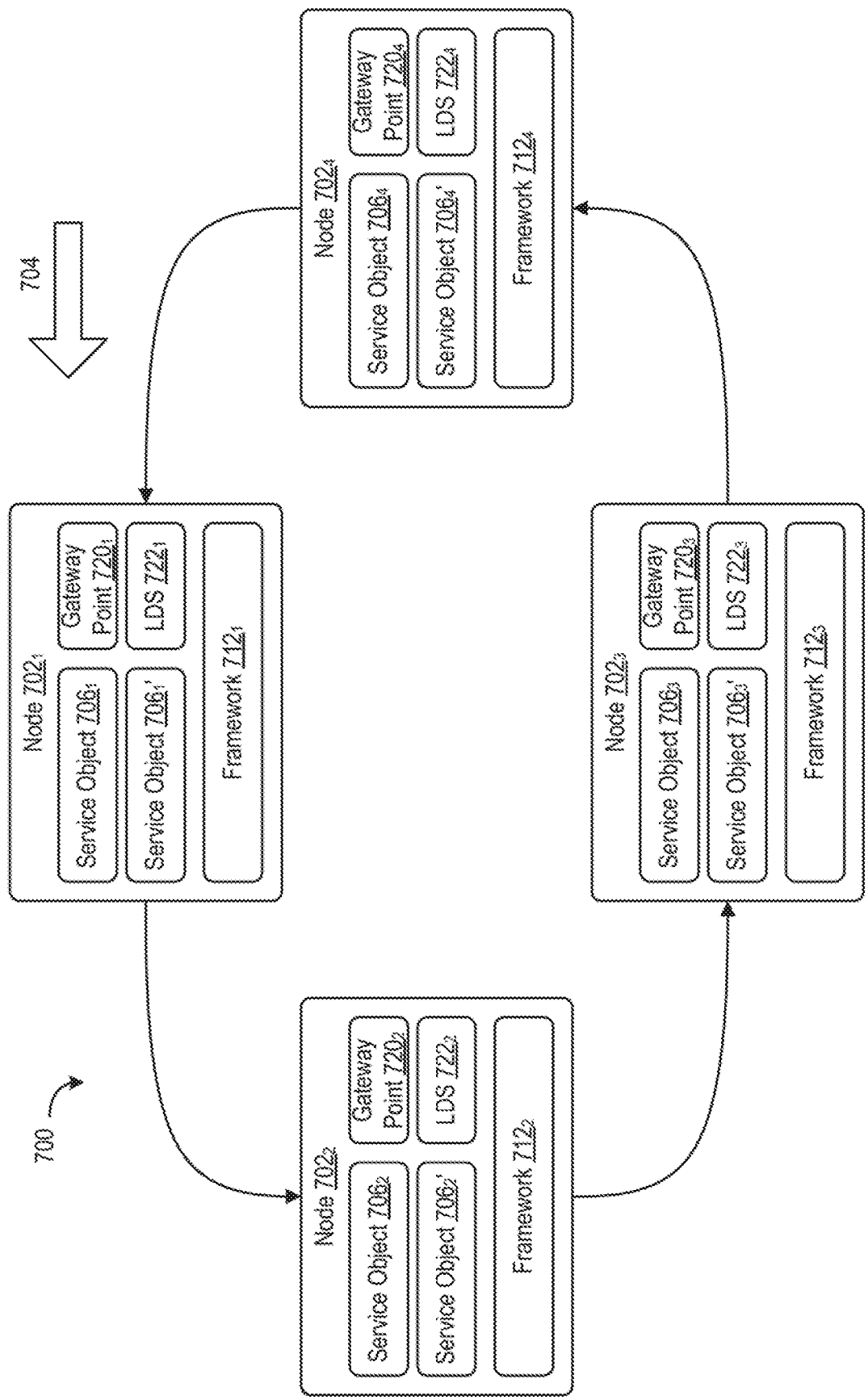
FIG. 7 illustrates an example cluster of nodes, according to an embodiment disclosed herein.

FIG. 7 illustrates an example cluster 700 of nodes $702_1$-$702_4$ (each node generically, node 702$i$). Each node 702$i$ is configured to run one or more services thereon. In an embodiment, each node 702$i$ is configured to run a unique service thereon. In another embodiment, a service may be run across two or more nodes 702$i$. As discussed above in conjunction with FIG. 2, each node 702$i$ generally includes framework 712$i$. Framework 712$i$ is substantially similar to framework 212$i$ discussed above.

A request 704 is received by node $702_1$. As illustrated, the node $702_1$ comes in at gateway point $720_1$ in node $702_1$. Local discovery service $722_1$ determines to which service object 706 to route the request. For example, as shown, node $702_1$ comprises service object $706_1$ directed to Version 1.0 of the service, and service object $706_1$' directed to Version 2.0 of the service. Using the method discussed above in conjunction with FIG. 6, local discovery service $722_1$ determines that service object $706_1$' is not yet at the available stage. Therefore, local discovery service $722_1$ designates Version 1.0 as the current version of service. As such, gateway point 720 routes the request to service object $706_1$ using the handler in framework $712_1$ associated with service object $706_1$.

After the request is routed to the designated service object in node $702_1$, the action carried out in the request is replicated to the remaining nodes (i.e., nodes $702_2$-$702_4$) in the cluster 700. For example, the request is then replicated to node $702_2$ through gateway point $720_1$ communicating with gateway point $720_2$ in node $702_2$. As shown, node $702_2$ comprises service object $706_2$ directed to Version 1.0 of the service, and service object $706_2'$ directed to Version 2.0 of the service. Using the method discussed above in conjunction with FIG. 6, local discovery service $722_2$ determines that service object $706_2'$ has reached the available stage. Therefore, local discovery service $722_2$ designates Version 2.0 as the current version of service. As such, gateway point $720_2$ routes the request to service object $706_2'$ using the handler in framework $712_2'$ associated with service object $706_2'$.

The request is then replication to node $702_2$ through gateway point $720_2$ communicating with gateway point $720_3$ in node $702_3$. As shown, node $702_3$ comprises service object $706_3$ directed to Version 1.0 of the service. Using the method discussed above in conjunction with FIG. 6, local discovery service $722_3$ determines that service object $706_3$ is the lone service object in node $702_3$. As such, Version 1.0 is the only version of the service available. Therefore, local discovery service $722_3$ designates Version 1.0 as the current version of service. As such, gateway point $720_3$ routes the request to service object $706_1$ using the handler in framework $712_3$ associated with service object $706_3$.

The request is then replicated to node $702_4$ through gateway point $720_3$ communicating with gateway point $720_4$ in node $702_4$. As shown, node $702_4$ comprises service object $706_4$ directed to Version 1.0 of the service, and service object $706_4'$ directed to Version 2.0 of the service. Using the method discussed above in conjunction with FIG. 6, local discovery service $722_4$ determines that service object $706_4'$ has reached the available stage. Therefore, local discovery service $722_4$ designates Version 2.0 as the current version of service. As such, gateway point $720_2$ routes the request to service object $706_4'$ using the handler in framework $712_4'$ associated with service object $706_4'$. Additionally, framework $712_4$ de-activates service object $706_4$ on node $702_4$. Accordingly, service object $706_4'$ associated with Version 2.0 of the service will be the only remaining service object remaining moving forward.

Accordingly, by deploying a subsequent service object associated with an updated version of the service of the existing service object, the cluster of nodes may continue to be available for processing service requests without having to pause or shut down for updating. As such, there is no longer a downtime during processing of requests, which has the tendency to result in hundreds, or thousands, of requests to be queued while the node is paused for service updates.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of processing a request entering a node cluster managed by a control plane executing on a computing system, comprising:
   receiving a request for a service at a first node of the node cluster; and
   determining to which service object in the first node to route the request, comprising:
      identifying an existing version of the service executing on the first node,
      determining whether there exists an updated version of the service executing on the first node,
      in response to determining that the updated version does not exist, routing the request to a first service object associated with the existing version,
      in response to determining that the updated version of the service does exist and is associated with a second service object, determining whether the second service object is available,
      in response to determining that the second service object associated with the updated version of the service is not available, routing the request to the first service object, and
      in response to determining that the second service object is available, routing the request to the second service object and setting the updated version as a current version of the service such that the updated version replaces the existing version.

2. The method of claim 1, further comprising:
   replicating the request among a plurality of peer nodes in the node cluster.

3. The method of claim 2, further comprising:
   replicating the request in a second node of the plurality of peer nodes in the node cluster, comprising:
   determining to which service object in the second node to route the request, comprising:
      identifying an existing version of the service executing on the second node;
      determining whether there exists an updated version of the service executing on the second node; and
      upon determining that the updated version of the service does exist, setting the existing version of the service on the second node as a current version of the service; and
   routing the request to a second service object associated with the current version of the service using a handler of the second service object in the second node.

4. The method of claim 3, further comprising:
   de-activating the first service object associated with the existing version of the service upon setting the updated version as the current version of the service.

5. The method of claim 1, wherein the existing version of the service and the updated version of the service are executed on the first node during an overlapping period.

6. A non-transitory computer readable medium having instructions stored thereon that when executed by a processor cause the processor to perform a method of processing a request entering a node cluster managed by a control plane executing on a computing system, comprising:
   receiving a request for a service at a first node of the node cluster; and
   determining to which service object in the first node to route the request, comprising:
      identifying an existing version of the service executing on the first node,
      determining whether there exists an updated version of the service executing on the first node,
      in response to determining that the updated version does not exist, routing the request to a first service object associated with the existing version,
      in response to determining that the updated version of the service does exist and is associated with a second service object, determining whether the second service object is available,
      in response to determining that the second service object associated with the updated version of the service is not available, routing the request to the first service object, and
      in response to determining that the second service object is available, routing the request to the second service object and setting the updated version as a current version of the service such that the updated version replaces the existing version.

7. The non-transitory computer readable medium of claim 6, wherein the method further comprises:
   replicating the request among a plurality of peer nodes in the node cluster.

8. The non-transitory computer readable medium of claim 7, wherein the method further comprises:
   replicating the request in a second node of the plurality of peer nodes in the node cluster, comprising:
   determining to which service object in the second node to route the request, comprising:
      identifying an existing version of the service executing on the second node;
      determining whether there exists an updated version of the service executing on the second node; and
      upon determining that the updated version of the service does exist, setting the existing version of the service on the second node as a current version of the service; and routing the request to a second service object associated with the current version of the service using a handler of the second service object in the second node.

9. The non-transitory computer readable medium of claim 8, wherein the method further comprises:
de-activating the first service object associated with the existing version of the service upon setting the updated version as the current version of the service.

10. The non-transitory computer readable medium of claim 6, wherein the existing version of the service and the updated version of the service are executed on the first node during an overlapping period.

11. A computer system, comprising:
a processor; and
a memory storing program code, which, when executed on the processor, performs a method of processing a request entering a node cluster managed by a control plane executing on a computing system, comprising:
receiving a request for a service at a first node of the node cluster, and
determining to which service object in the first node to route the request, comprising:
identifying an existing version of the service executing on the first node;
determining whether there exists an updated version of the service executing on the first node;
in response to determining that the updated version does not exist, routing the request to a first service object associated with the existing version;
in response to determining that the updated version of the service does exist and is associated with a second service object, determining whether the second service object is available;
in response to determining that the second service object associated with the updated version of the service is not available, routing the request to the first service object; and
in response to determining that the second service object is available, routing the request to the second service object and setting the updated version as a current version of the service such that the updated version replaces the existing version.

12. The computer system of claim 11, wherein the existing version of the service and the updated version of the service are executed on the first node during an overlapping period.

13. The computer system of claim 11, wherein the method further comprises:
replicating the request among a plurality of peer nodes in the node cluster.

14. The computer system of claim 13, wherein the method further comprises:
replicating the request in a second node of the plurality of peer nodes in the node cluster, comprising:
determining to which service object in the second node to route the request, comprising:
identifying an existing version of the service executing on the second node;
determining whether there exists an updated version of the service executing on the second node; and
upon determining that the updated version of the service does exist, setting the existing version of the service on the second node as a current version of the service; and
routing the request to a second service object associated with the current version of the service using a handler of the second service object in the second node.

15. The computer system of claim 14, wherein the method further comprises:
de-activating the first service object associated with the existing version of the service upon setting the updated version as the current version of the service.

* * * * *